May 26, 1953 F. J. WRIGHT 2,639,652
MOTORIZED TRENCH ROLLER
Filed April 21, 1948 5 Sheets-Sheet 2

INVENTOR;
FRED J. WRIGHT,
BY
ATT'Y.

May 26, 1953   F. J. WRIGHT   2,639,652
MOTORIZED TRENCH ROLLER
Filed April 21, 1948   5 Sheets-Sheet 3

INVENTOR;
FRED J. WRIGHT,
BY
ATT'Y.

May 26, 1953 F. J. WRIGHT 2,639,652
MOTORIZED TRENCH ROLLER
Filed April 21, 1948 5 Sheets-Sheet 4

INVENTOR;
FRED J. WRIGHT,
BY
ATT'Y.

Patented May 26, 1953

2,639,652

UNITED STATES PATENT OFFICE 2,639,652

MOTORIZED TRENCH ROLLER

Fred J. Wright, Columbus, Ohio, assignor to The Galion Iron Works & Manufacturing Company, a corporation of Ohio Application April 21, 1948, Serial No. 22,390

6 Claims. (Cl. 94—50)

My invention relates in general to road rolling machinery and more particularly to rolling machines known generally as trench rollers utilized in rolling material in a trench, formed, for example, alongside an existing road when the road is being widened.

It is one object of my invention to provide an improved roller of the above mentioned type.

It is another object of my invention to provide an improved roller having a wide rimmed roll and a bicycle unit including a pair of wheels and a power unit positioned laterally of the wide rimmed roll and connected thereto by a frame.

It is another object of my invention to provide an improved roller having a roll and a bicycle unit including a pair of wheels that are preferably, but not necessarily, reversely steerable and in tandem relation wherein the roll and bicycle unit are connected by a main frame that includes linkage mechanism whereby the relative height of the planes in which the axes of the bicycle wheels and the axis of the roll may be shifted with respect to each other.

In carrying out the foregoing object it is another object of my invention to provide the main frame with a power means for adjusting the length thereof, which power means preferably, but not necessarily, forms a structural part or parts of the main frame.

It is another object of my invention to provide an improved roller having a roll and bicycle unit including a pair of wheels that are preferably, but not necessarily, reversely steerable that may be swung from substantially a tandem position or relation to substantially a parallel relation or position to permit towing of the roller as a two-wheeled trailer when the wheels are swung to a parallel relation or position.

In carrying out the foregoing object it is another object of my invention to provide means for attaching the roller to a towing vehicle whereby the roll of the roller may be supported above the ground to permit towing of the roller as a trailer.

It is another object of my invention to provide an improved roller wherein the main frame of the roller carries a hydraulic pump and a motor for driving it and the motor which drives the roll of the roller is also carried by the main frame and is positioned substantially entirely within the lateral dimensions of the roll and preferably, though not necessarily, drives the roll through a multiple lobe cam carried directly by the roll.

It is another object of my invention to provide an improved reversible roller having a roll and laterally spaced therefrom a bicycle unit including a pair of reversely steerable wheels in tandem relation, the bicycle unit carrying a primary pump and motor for driving it and a hydraulic motor for driving the roll and wherein the frame connecting the bicycle unit and the roll preferably, but not necessarily, includes an operator's seat positioned above the roll.

Other objects of my invention will appear hereinafter the novel features and combinations being set forth in the appended claims.

In the accompanying drawings.

Figure 1:
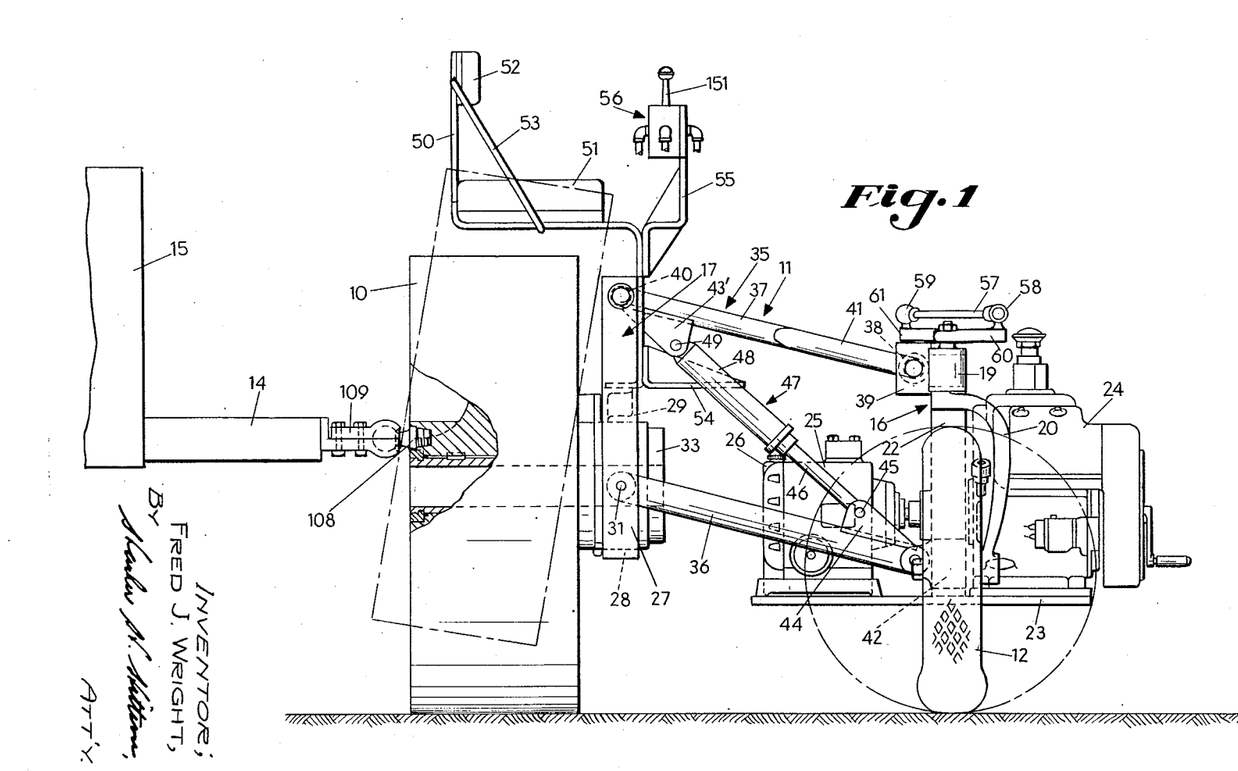
Fig. 1 is an end view in elevation with parts omitted of a three-wheeled trench roller including features of my invention, the trench roller being shown in full lines in trench rolling position but connected to a tow-bar of a towing vehicle, the figure indicating in dot-dash lines the positions of the roll and bicycle wheels of the roller when the roller is being towed as a two-wheeled trailer.
Figures 2, 4:
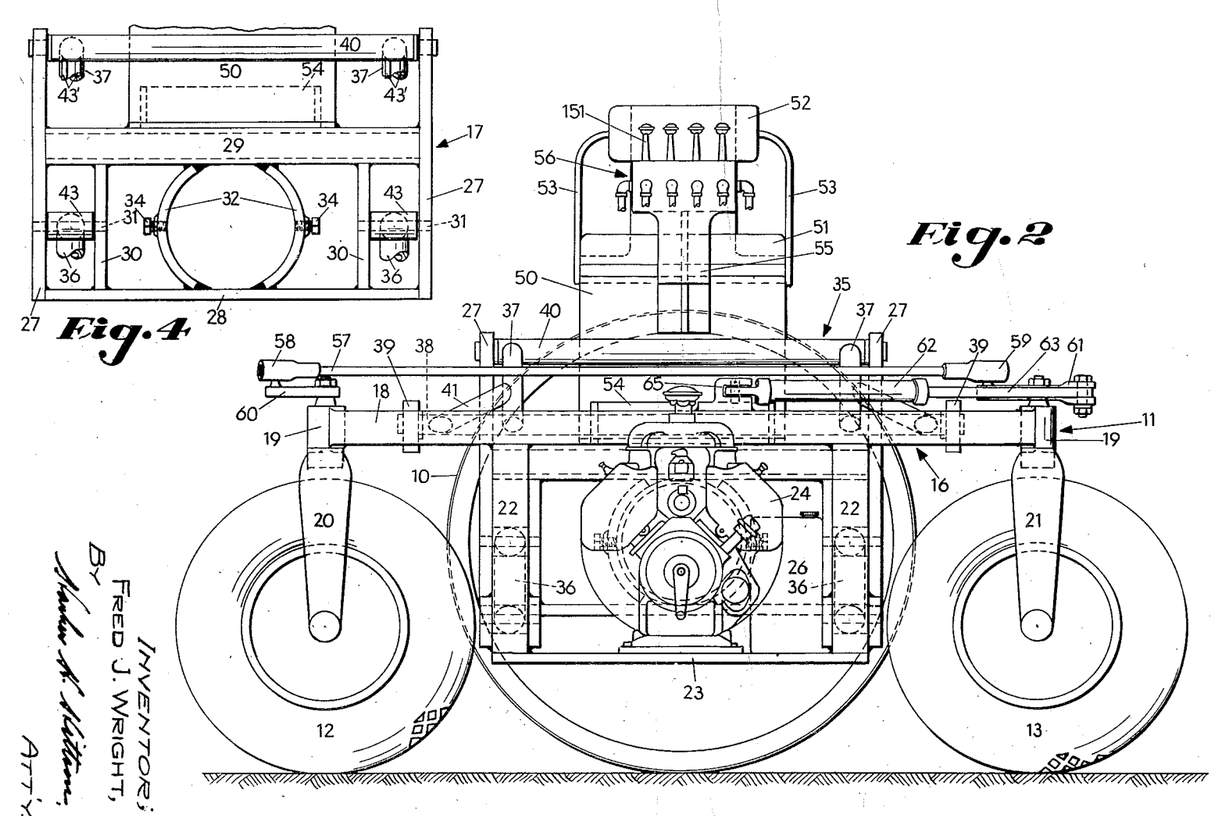
Fig. 2 is a side view in elevation with parts omitted of the trench roller shown in Fig. 1 showing the trench roller in trench rolling position.
Fig. 4 is a view in section showing one side of the main frame of the trench roller, the view being taken on line 4—4 of Fig. 3.
Figure 3:
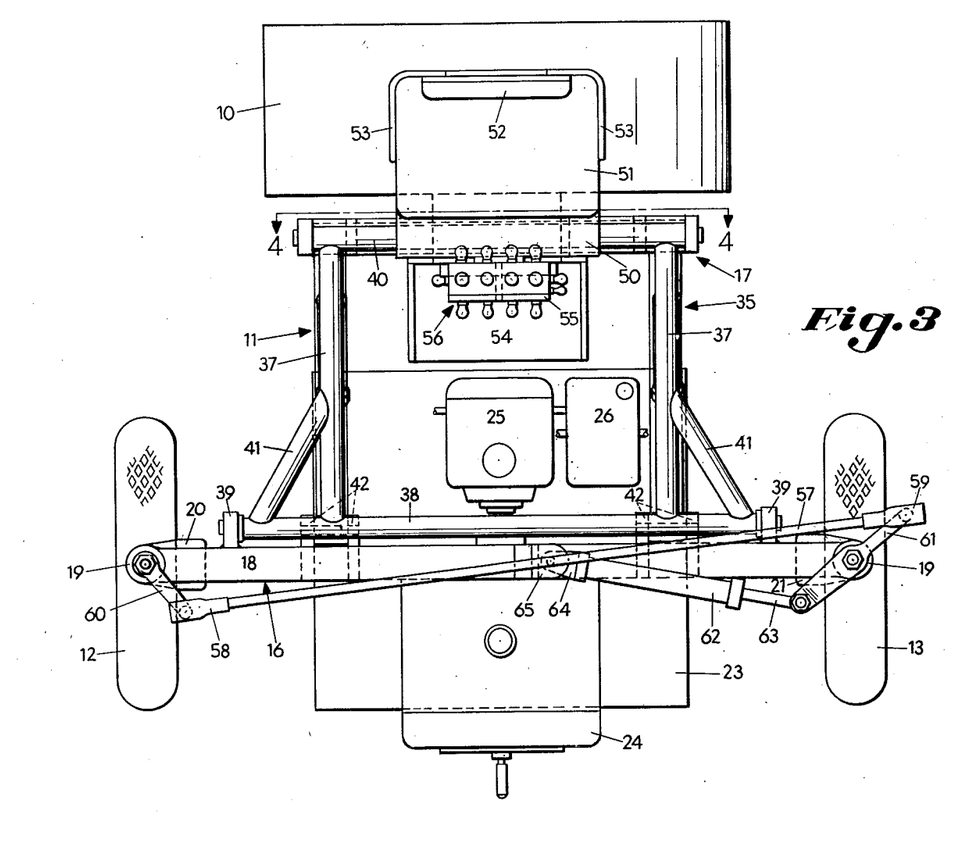
Fig. 3 is a view in plan with parts omitted of the trench roller seen in Figs. 1 and 2 showing the bicycle wheels in parallel or towing position.

Referring first to Figs. 1 through 4 of the drawings, the trench roller shown therein embodying the features of my invention is a three-wheeled or tricycle type trench roller that includes a wide rimmed roll 10 adapted to roll material such, for example, as stone or the like, into a ditch formed alongside an existing road when the road is being widened. The wide rimmed roll 10 forms one of the wheels of the trench roller when the roller is operating to roll material into a ditch and this roll supports one side of the main frame 11 of the trench roller. The opposite side of the main frame 11 is supported by a pair of reversible steerable pneumatic tired wheels 12 and 13 which wheels are seen in Figs. 1 and 2 in bicycle or tandem position or relation and in which position or relation their axes are parallel to the axis of the roll 10. The bicycle wheels 12 and 13 are reversibly steerable and they may be swung as indicated in Fig. 1 and as shown in Fig. 3 to a position or relation in which they are parallel to each other, that is, the position or relation wherein their axes are substantially coincident whereby the trench roller may be towed upon the wheels 12 and 13 as a two-wheeled trailer by a towing vehicle when the roll 10 is supported from the ground by a tow-bar 14 of a towing vehicle 15, a portion of which is seen in Fig. 1.

The main frame 11 of the trench roller includes a pair of spaced upright side portions one of which forms the frame 16 of the bicycle unit that includes and is supported by the pneumatic tired wheels 12 and 13 and the other side 17 of which forms a support or frame means for mounting the motor that drives the roll 10 and which is supported by the roll 10. That portion of the main frame 11 which forms the frame 16 of the bicycle unit includes a main beam 18 having welded to each of its ends on a vertical or steering axis an open ended tubular member 19. One of the tubular members 19 receives and mounts for rotation about the steering axis a wheel carrying arm 20 for wheel 12 and the other tubular member 19 mounts a wheel carrying arm 21 for wheel 13 in a similar manner. The main beam 18 of the bicycle unit 16 supports a pair of spaced vertical frame members 22 which members are connected at their bottom ends to a platform, bed or base plate 23 adapted to support an internal combustion engine 24 which drives a hydraulic pump unit 25. The platform, bed or base plate 23 also supports a tank 26 for hydraulic fluid, which tank and pump unit 25 form parts of a hydraulic system hereinafter described in detail in connection with Fig. 7.

As best seen in Fig. 1, the support or frame means 17 of the main frame 11 for the roll driving motor is placed laterally of that portion of the main frame 11 which forms the frame 16 of the bicycle unit. As best seen in Fig. 4 the roll motor supporting or frame means 17 of main frame 11 includes a pair of spaced vertically extending side members 27 connected at their bottoms by a cross bar 28 and approximately at their centers by a cross member 29 formed of a pair of angle bars. Extending vertically between the cross bar members 28 and 29 and spaced inwardly of the side members 27 is a pair of frame members 30. Each frame member 27 and the frame member 30 adjacent thereto is bored to receive a pin 31 that is preferably locked therein to form a bearing for a frame strut, hereinafter described, which interconnects an upright member 22 of the frame 16 of the bicycle unit and the roll member supporting frame means 17.

Between the frame members 30 and positioned radially about the center of the area defined by the frame members 28, 29 and 30 are a pair of arcuate members 32 adapted to receive a supporting unit or housing 33 associated with the roll driving motor, which supporting unit or housing 33 is locked therein by a pair of cap screws 34. The arcuate frame members 32 are preferably permanently attached to the frame members 17 as by welding their ends to the horizontal frame members 28 and 29.

The main frame 11 of the trench roller includes structure by which the horizontal plane in which the axes of the wheels 12 and 13 lie may be shifted vertically with respect to the plane in which the axis of roll 10 lies, that is, as seen in Fig. 1, the main frame 11 includes connector members which connect the roll support or frame means 17 and frame 16 of the bicycle unit whereby these members form upright sides of a parallelogram that may be moved vertically with respect to each other by a power means which is an integral part of the main frame 11. The frame members which connect the frame 16 of the bicycle unit and the frame means 17 include an upper unit 35 and a pair of spaced lower struts 36. The upper unit 35, as best seen in Fig. 3, includes tubular side members 37 each welded at one of their ends to a tube 38 the ends of which are received pivotally through removable bearing means by bearing blocks 39 welded directly to the main beam 18 of the bicycle unit. The opposite ends of the tubular side members 37 are welded to a tubular member 40 the ends of which are also received through removable bearing means by openings formed in the uppermost ends of the spaced side members 27 of the motor supporting frame means 17. Suitable tubular bracing struts 41 also connect the tubular side members 37 with the tube 38 and these struts 41 are preferably welded at their ends to both tubes 37 and 38.

The lower main frame struts 36 are each pivotally connected at one end between a pair of spaced brackets 42 welded to the upright frame members 22 of the bicycle unit 16 and the opposite ends of the struts 36 include cross heads 43 (see Fig. 4) which are bearinged upon the pins 31 between the frame members 27 and 30.

The tubular side members 37 of the upper unit 35 each have welded thereto adjacent the tubular member 40 a pair of downwardly extending brackets, ears or lugs 43' and each of the struts 36 lies directly below one tubular side member 37 of the unit 35 and adjacent its supporting bracket 42 has a pair of upwardly extending brackets, ears or lugs 44 similar to the brackets, ears or lugs 43' that receive in aligned openings therein a bearing or connector pin 45. Bearing or connector pin 45 extends through an end bearing portion of a piston rod 46 of a double acting hydraulic piston motor or expandable and contractable main frame strut 47 and the cylinder 48 of hydraulic motor 47 includes an end bearing portion received by a pin 49 extending between and through openings in the brackets, ears or lugs 43' of each side member 37.

As seen in Fig. 1, when the double acting hydraulic piston motor or frame strut 47 is contracted, that is, when its overall length is reduced, that portion of the main frame 11 which forms the motor supporting frame means 17 will be lowered as required, for example, when the roll 10 is to operate to roll a ditch the bottom surface of which is below the road surface or that surface upon which the wheels 12 and 13 are riding and, of course, when hydraulic piston motor 47 is expanded, that is, when its overall length is increased the axis of the roll 10 will be raised or elevated with respect to the axes of the wheels 12 and 13.

The main frame 11 also includes a member 50 that extends upwardly from the center of the roll motor supporting frame 17 and as best seen in Fig. 1 this member 50 is bent rearwardly to extend above the roll 10 and upwardly to form the back of an operator's seat that is positioned directly above the roll 10. The seat member 50 of the main frame 11 has secured thereto a seat cushion 51 and a seat back cushion 52 and that portion of the member 50 that forms the back of the operator's seat is braced from the seat portion thereof by a pair of tubular side bars or braces 53. The operator's seat is positioned above the roll 10 so that an operator seated thereon may, by looking to either side, look directly into the ditch in which the roll 10 is operating and the seat faces the bicycle unit of the trench roller so that the operator may see the operating parts and the bicycle wheels of the trench roller by looking forwardly from his seat above the roll 10 upon the bicycle unit. Extending from the seat member 50 toward the bicycle unit, that is, toward that portion of the main frame 11 that forms the main frame 16 of the bicycle unit, is an operator's footrest or support 54 positioned centrally in front of the operator's seat and above the footrest 54 is a relatively narrow frame member or bracket 55 that supports a hydraulic control valve unit 56 by which the operator controls the operation of the trench roller. Bracket 55, as seen in Fig. 2, is T-shaped in order that the operator may straddle it with his legs and this frame member 55 is carried at its bottom by the seat member 50.

Referring again to that portion of the trench roller herein designated as the bicycle unit, the wheels 12 and 13 are reversely steerable and are interconnected by steering mechanism positioned above the main beam 18 of the bicycle unit 16. This steering mechanism includes a drag link 57 that carries at one of its ends a ball socket connector 58 and at its other end a ball socket connector 59. Ball socket connector 58 receives a ball of a lever or crank 60 that is keyed and secured directly to the upper end of the pivotal shaft or king pin portion of the wheel carrying arm 20 for swinging the wheel 12 about the steering axis of arm 20 and ball socket connector 59 receives a ball of one arm of a lever or crank 61 that is keyed or secured directly to the upper end of the pivotal shaft or king pin portion of the wheel carrying arm 21 for swinging the wheel 13 about the steering axis of arm 21.

As viewed in Fig. 3 of the drawings the lever or crank 60 extends downwardly from the pivotal shaft or king pin of arm 20 and that arm of the lever or crank 61 that is attached to the drag link 57 through ball socket connector 59 extends upwardly from the pivotal shaft or king pin of arm 21 and thus if the wheel 13 and arm 61 are swung in a counter-clockwise direction, as viewed in Fig. 3, the drag link 57 will rotate or swing the arm or lever 60, the wheel carrying arm 20, and the wheel 12, in a clockwise or opposite direction. Thus, it will be seen that the wheels 12 and 13 are reversely steerable whereby the entire trench roller may be steered around either an inside or an outside curve with the axis of the roll 10 lying substantially on or coinciding with the radius of the curve. Steering motion or power is imparted to wheels 12 and 13 by a double acting hydraulic piston type motor 62 the piston rod 63 of which is pivotally connected to a second arm of the lever 61 and one end 64 of the cylinder of the steering motor 62 is carried for pivotal movement upon a pin that is carried in a bifurcated bracket 65 on the main beam 18 of the bicycle frame 16. The wheels 12 and 13 of the bicycle unit may be swung by the double acting steering motor 62 and the steering linkage simultaneously in different directions from their tandem positions, as seen in Figs. 1 and 2, for steering the trench roller while it is rolling a ditch and the wheels 12 and 13 may be swung by the double acting steering motor 62 and the steering linkage to positions in which they are parallel, that is, to positions wherein their axes are substantially coincident, as seen in Fig. 3, whereby the trench roller may be towed by the towing vehicle as a two-wheeled trailer when the roll 10 is supported by a towing vehicle and elevated from the ground. This position of the wheels 12 and 13 is determined by fully contracting the steering motor 62.

Figure 5:
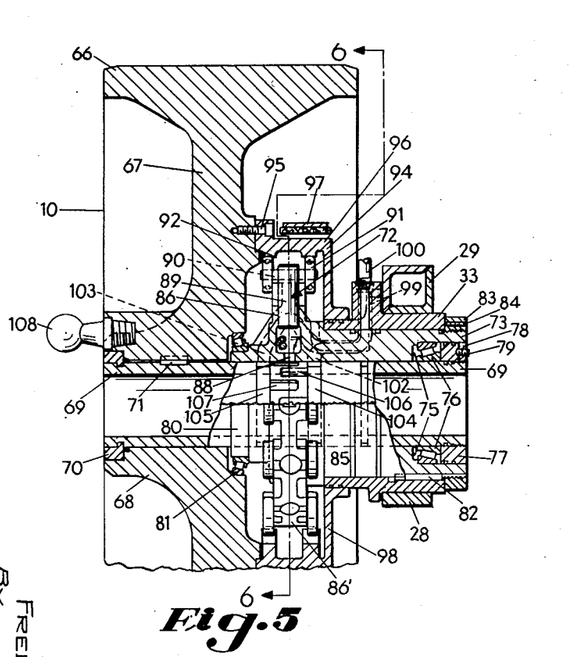
Fig. 5 is a view in section of a fragment of the trench rolling roll of the roller, the section being taken substantially centrally through the roll.
Figure 6:
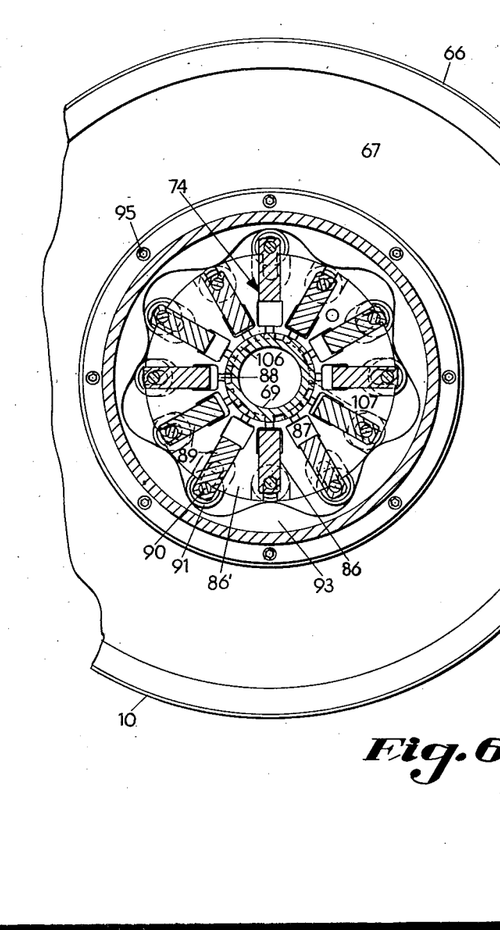
Fig. 6 is a view in section, the section being taken substantially on line 6—6 of Fig. 5.

Referring now to Figs. 5 and 6 and particularly to the structure of the roll 10 and the hydraulic motor which is contained within its confines and drives it, the roll 10 may be a casting and it includes a wide material rolling rim 66, a central disk or body portion 67 and a hub 68. Extending through a central bore in the hub 68 is a tubular axle 69 that is placed in the bore of the hub 68 by sliding it endwardly through the outer end thereof. Axle 69 is grooved circumferentially adjacent its outer end to receive a split locking member or ring 70 that seats or is confined, when axle 69 is in place, in an enlarged portion of the central bore of the hub 68. Ring 70 prevents roll 10 from slipping off of the axle 69. Axle 69 is locked by a key 71 to the roll 10 in order that it will rotate therewith so that the axle 69 will function as a valve or port shaft for the cylinders of the radial type hydraulic motor that is indicated generally at 72 which drives the roll 10 in reverse directions. Axle 69 also extends centrally through a tubular motor cylinder block 73 that includes a plurality of hydraulic motor cylinders 74 in a radial flange portion 86' thereof. The tubular cylinder block 73 includes at its end remote from the hub 68 of roll 10 a bore or cup 75 that receives a tapered roller bearing 76 that surrounds the axle 69. Bearing 76 is held in position by a grease retainer and bearing adjusting collar 77 that is sawed or split to provide a locking portion 78. Collar 77 is threaded on the axle 69 for securing the axle within the cylinder block 73 and for adjusting the bearing 76 and a motor block supporting bearing 81. There extends through the locking portion 78 of collar 77 an adjusting screw 79 that abuts the body of collar 77 and when adjusting screw 79 is tightened the locking portion 78 is sprung sidewardly to lock collar 77 upon the threads of axle 69. The end of the cylinder block 73 adjacent the hub 68 is flanged at 80 to receive the tapered roller bearing 81 received in a bearing cup formed directly in the hub 68 of roll 10. The tubular cylinder block 73 is keyed into the supporting unit or housing 33 that is received and carried by the side 17 of the main frame 11 of the trench roller by a key 82 and it is held therein against axial movement in one direction by a collar 83 threaded thereon that abuts one end of the housing 33. Collar 83 is locked to housing 33 by a set screw 84. The housing 33 is held against axial movement in the other direction by a shoulder 85 formed on the cylinder block 73.

From the description of the roll 10 and its associated mechanism thus far given it will be obvious that the side 17 of the main frame 11 that is supported by the roll 10 is carried by the support or housing 33 that is fixed therein which in turn is carried by the cylindrical motor block 73 that is fixed therein against rotation and axial movement and that one end of motor block 73 is carried directly by the hub 68 of roll 10 through the roller bearing 81 while the other end of motor block 73 is carried through the roller bearing 76 by the axle 69. Motor block 73 includes a flat disk or flange portion 86' positioned adjacent the central disk or body portion 67 of the roll 10 that includes radially extending cylinders 74 of the reversible hydraulic motor 72 that drives the roll 10.

As seen in Fig. 6 there are twelve of the cylinders 74 and each of these cylinders 74 includes a piston guiding bore 86 and a larger bore portion, chamber or cylinder head 87 positioned radially inwardly of the piston guiding bore 86. Each cylinder head 87 is connected with the bore or surface of the cylinder block 73 that surrounds the axle 69 by a single bore or port 88 for the admission and exhaust of hydraulic fluid to and from the cylinder head 87. A piston 89 reciprocates in each of the bores 86 and the outer end of each of these pistons 89 is cross bored to receive a cross pin or head 90 that reciprocates in slots formed in the opposite sides of the piston guiding bore 86. Upon each end of each cross pin or head 90 there is carried an antifriction bearing or cam roller 91 the outer races of which engage and ride upon identically spaced cam surfaces 92 having a plurality of lobed cam surfaces 93 that are formed integrally with a casting 94 secured directly to the central disk or body portion 67 of the roll 10 by cap screws 95.

The outer surface of casting 94 forms a brake drum 96 that is adapted to be acted upon by the brake band 97 (Figs. 5 and 7) of a hydraulic brake mechanism of the trench roller. The reversible hydraulic motor 72 is contained entirely within the confines of the roll 10 and a part of the central disk or body portion of the the roll 10 forms one side wall of a housing which encloses the motor 72. The outer wall of this enclosing housing is formed by the wall of the casting 94 that includes the multiple lobed cams 92 and the other side wall of the housing is formed by a wall or flange 98 that surrounds the end of the housing 33 adjacent the shoulder 85 of the cylinder block 73.

As seen in Fig. 6, each of the multiple lobed cams includes seven lobes 93 and there are twelve pistons 89 acting through anti-friction cam rollers 91 upon these seven lobes to produce or cause rotation of the multiple lobed cams 92. It will be seen that each lobe 93 of each cam 92 is symmetrical, that is, its cam surfaces lying to each side of its apex are identical in contour and therefore each lobe 92 provides a rising and falling cam surface to a cam roller 91 rolling thereover. Because there are a greater number of pistons 89 acting upon a lesser number of cam surfaces, the radial piston motor 72 has no dead center or inoperative positions since some of the cam rollers 91 of some of the pistons 89 are at all times in engagement with both the rising and falling surfaces of the lobes 93 of cams 92. The direction of rotation of the cams and consequently the roll 10 about the stationary motor block 73 will be determined by the supply of hydraulic fluid to certain of the cylinders 74, as is now to be described.

The housing 33 is provided with two bores 99 connected with conduits 100 and 101 of the hydraulic system or apparatus of the trench roller. One of the conduits 99 opens at its inner end into a conduit 102 in cylinder block 73 that leads or opens through the central or axle receiving bore of the motor block 73 at one side of the flange portion thereof that includes the motor cylinders 74 and the other conduit 99 opens at its inner end into a conduit 103 in the cylinder block 73 that leads and opens through the central or axle receiving bore of the motor block 73 on the opposite side of the flanged portion thereof that includes the motor cylinders 74.

The tubular axle 69 is provided with spaced circumferential grooves or channels 104 and 105 in communication with conduits 102 and 103, respectively. From the circumferential groove or channel 104 there extends in the axle toward the opposite channel 105 seven notches, ports or stub channels 106 and there extends from the channel 105 toward the channel 104 but centrally between the stub channels 106 seven notches, ports or stub channels 107.

As seen in Fig. 5, the stub channels 106 and 107 extend from their respective circumferential channels 104 and 105 only such distance as to lie under and communicate with the ports 88 leading to the cylinder heads 87 of the cylinders 74 as the axle 69 rotates in the cylinder block. Conduits 100 and 101 are adapted to act as supply and exhaust conduits, respectively, for hydraulic fluid flowing to and from the motor 72 and their order may be reversed to reverse the direction of rotation of the roll 10, that is, conduit 101 may be caused to become the supply conduit and conduit 100 may be caused to become the exhaust conduit, as is more fully described hereinafter in connection with Fig. 7.

As seen in Figs. 5 and 6, when conduit 100 is the supply conduit hydraulic fluid under pressure will pass through conduit 100, conduits 99, 102, the circumferential groove 104 in axle 69 and into the stub channels 106 and through those ports 88 of cylinders 74 that are in communication with stub channels 106 into the cylinders to force their pistons 89 outwardly which, of course, will cause rotation of the cam 92 and the roll 10 in one direction.

As seen in Fig. 6 when the stub channels 106 are supplied with hydraulic fluid under pressure the motor cylinders that are in communication with them through the ports 88 are all on the counter-clockwise sides of cams or lobes 93 and outward movement of their pistons will cause rotation of the cams 92 in a clockwise direction. The cylinders whose pistons and cam rollers 91 are engaging the clockwise side of the cam surface of the cam lobes 93 have their ports 88 in communication with the stub channels 107 and hydraulic fluid displaced from the cylinders 74 by inward movement of their pistons 89 will be conducted to the conduit 101 acting as the exhaust conduit in the hydraulic system through channel 105, conduit 103 and the other conduit 99 in housing 33. When the stub channels 107 are caused to be the supply channels for hydraulic fluid under pressure then the stub channels 106 will conduct the fluid exhausted from the cylinders 74 and the direction of rotation of the cams 92 and roll 10 will be reversed.

Offset from its hub 68, roll 10 carries a ball 108 of a trailer hitch that is adapted to be received in a socket mechanism 109 (Fig. 1) attached to the rear end of the tow-bar 14 on the truck or towing vehicle 15, and when connected thereto the roll 10 may be rotated by the hydraulic roll driving motor 72 which, of course, will lift the roll 10 from the ground to the position indicated in dot-dash lines in Fig. 1 in which position the roll will be locked by the brake band 97. It is, of course, to be understood that the wheels 12 and 13 will be swung to and held in their parallel position indicated in Fig. 1 and shown in Fig. 3 by the steering motor 62 when the trench roller is to be towed by the truck or vehicle 15 as a two-wheeled pneumatic tired trailer.

Figure 7:
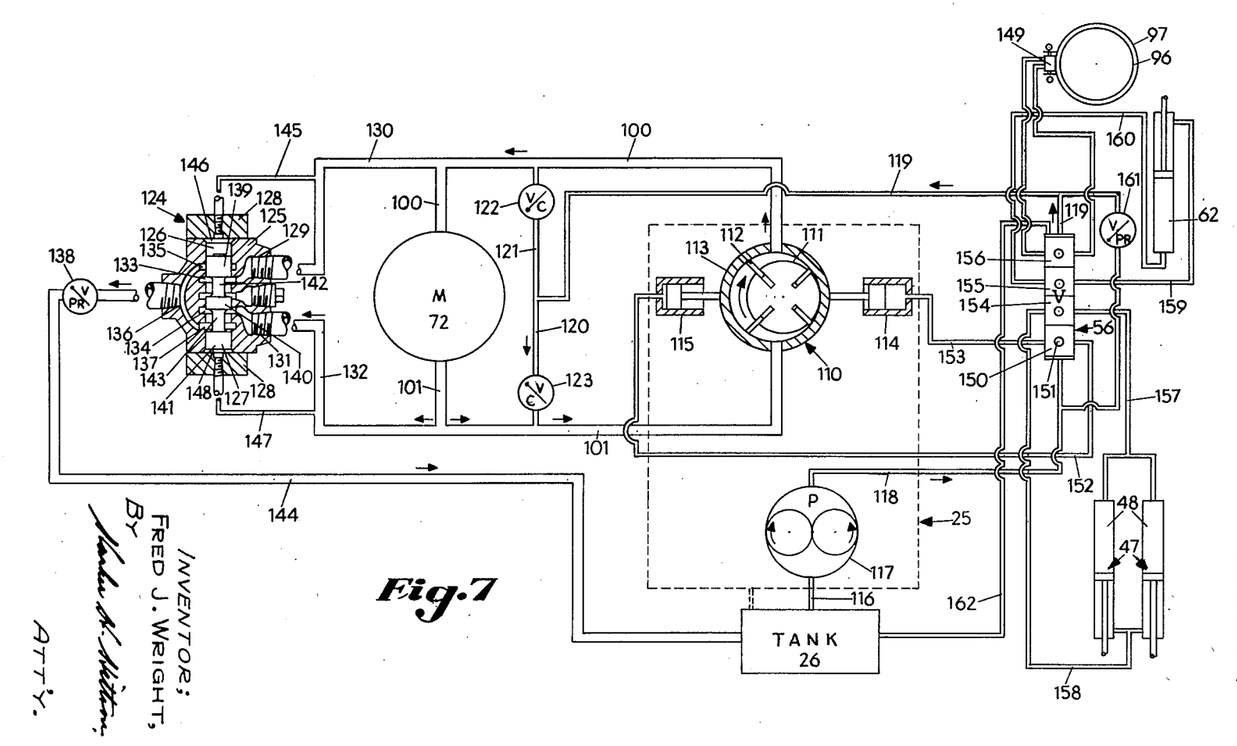
Fig. 7 is a diagrammatic view of the hydraulic system of the trench roller.

Referring now to Fig. 7 of the drawings wherein the hydraulic system of the trench roller is diagrammatically shown, the hydraulic system includes a closed high pressure and high volume hydraulic circuit which includes a high pressure, variable delivery, reversible pump 110 which is capable of being adjusted from a zero output volume to a large or high output volume of hydraulic fluid under high pressure. Pump 110 is contained in the pump unit 25. The high pressure and high volume hydraulic circuit also includes the high pressure and high volume, reversible radial type hydraulic motor 72 that reversibly drives the roll 10 directly through the cams 92, and the conduits 100 and 101 that connect the high pressure, variable delivery, reversible pump 110 with the motor 72. The pump 110, as seen in Fig. 7, is discharging or pumping hydraulic fluid into the conduit 100 to drive the roll motor 72, as previously described in connection with Figs. 5 and 6, and the conduit 101 conducts the hydraulic fluid exhausted from the motor 72 to the port of the pump 110 acting as the intake or suction port thereof. Hydraulic fluid in the closed circuit including pump 110, conduit 100, motor 72 and conduit 101 is re-circulated, that is, fluid exhausted by the motor 72 flows back to the pump 110 through the conduit 101 and is pumped by the pump 110 through conduit 100 back to the motor 72. The output volume of pump 110, as previously set forth, may be varied from zero to a high volume and the pump 110, as shown diagrammatically, includes a rotor 111 having reciprocating vanes 112 that operate in a ring or housing 113 the axis of which may be shifted with respect to the axis of the rotor 111. It will be seen, of course, that when the axis of the rotor 111 and the axis of the ring or housing 113 coincide, that the pump 110 will not be operating to produce any output of hydraulic fluid either into the conduit 100 or 101. In order to cause the pump 110 to pump hydraulic fluid, the axis of ring or housing 113 may be shifted or offset with respect to the axis of the rotor 111 either to the right or left and the amount of offsetting of these axes determines the output volume of the pump 110. If the ring or housing 113 is shifted to the left, as seen in Fig. 7, the pump 110 will discharge into conduit 100 and if the ring or housing 113 is shifted to the right, the pump 110 will discharge into conduit 101. The ring or housing 113 is shifted to the right by a piston motor 114 and to the left by a piston motor 115.

The entire hydraulic system also includes the tank 26 which is a reservoir for hydraulic fluid used in the hydraulic system. From the hydraulic tank 26 a supply conduit 116 leads to a low volume, low pressure, constant delivery pump 117. Pumps 110 and 117 are both contained within the pump unit 25 and may both be driven from the same shaft, which shaft is driven by the internal combustion engine 24. The hydraulic fluid pumped by pump 117 is conducted through a conduit 118 into one end of the control valve unit 56. For the moment it will suffice to say of the control valve unit 56 that hydraulic fluid normally passes through it and is discharged from the opposite end thereof into a conduit 119 that leads to conduits 120 and 121 which connect, respectively, with conduits 101 and 100.

Conduit 121 includes a check valve 122 and conduit 120 includes a check valve 123. When the closed hydraulic circuit including pump 110, motor 72 and conduits 100 and 101 is operating as previously described, the output of hydraulic fluid pumped by pump 110 is supplied to motor 72 through conduit 100 and the pressure in conduit 100 will close the check valve 122 in conduit 121. Conduit 101, which is acting as the low pressure conduit of the closed system and through which hydraulic fluid is being conducted from the motor 72 to the intake or suction port of motor 110, will be subjected to a relatively low hydraulic pressure and check valve 123 in conduit 120 will open under pressure of the hydraulic fluid pumped by pump 117 in conduits 119 and 120 to admit the hydraulic fluid pumped by pump 117 to the conduit 101. It will be seen, of course, that the volume of hydraulic fluid flowing into conduit 101 will be considerably less than the volume of the hydraulic fluid discharged from the motor 72 when the pump 110 is operating at full capacity but it will also be seen that an amount of hydraulic fluid substantially equal to the amount added by the pump 117 to the conduit 101 must be displaced from the low pressure conduit 101. It will be seen also that when the output volume or pressure of pump 110 is directed into conduit 101, the pressure in conduit 101 will close check valve 123 and check valve 122 in conduit 121 will open to pass the hydraulic fluid pumped by pump 117 into the conduit 100 acting as the low pressure or suction side of the high pressure closed system. In order to permit hydraulic fluid to be displaced from the conduits 101 and 100 there is connected to the conduits 100 and 101 of the high pressure, high volume closed circuit, a shiftable spool type valve 124.

Valve 124 includes a body 125 having a central bore 126 in which there is slidably received a piston or spool 127. The ends of body 125 are closed by caps 128. The body 125 of valve 124 includes a threaded opening 129 that receives a conduit 130 connected to the conduit 100 and the body 125 includes another threaded opening 131 that receives a conduit 132 connected to conduit 101. Threaded opening 129 connects with an annular channel 133 formed in the bore 126 and the threaded opening 131 connects with another annular channel 134 in the bore 126. Spaced outwardly of channel 133 in an annular channel 135 that connects with a threaded exhaust opening 136 in the body 125 and spaced outwardly of the annular channel 134 is an annular channel 137 that is also connected with the threaded exhaust opening 136. Threaded exhaust opening 136 receives a conduit 144 in which there is interposed a pressure relief valve 138. Valve 124 is a conventional valve well known to those skilled in the art and in actual construction this valve includes an annular groove positioned centrally of the bore 126 that is connected with a threaded opening in the side of the body 125. This central annular groove is unnecessary to the present invention and therefore the port communicating with it is closed by a pipe plug.

The piston 127 of valve 124 includes three spaced lands 139, 140 and 141. Lands 139 and 140 are connected by a reduced diameter portion 142 of the piston 127 and lands 140 and 141 are connected by a reduced diameter portion 143 of the piston 127. The lands are so spaced that when the piston 127 is moved downwardly, as shown in Fig. 7, the annular channel 134 connected with opening 131 is connected through the bore 126 with the circular opening 137 which in turn is connected to the conduit 144 which leads through the pressure relief valve 138 and to the tank or reservoir 26. The spacing of lands 139 and 140 on piston 127 is also such that when the piston 127 is positioned as seen in Fig. 7 to place the annular channels 134 and 137 in communication, that communication between the annular channels 133 and 135 is blocked by land 139. When the piston 127 is shifted upwardly to its top position, the channel 134 will be isolated by the land 141 from the channel 137 to block the flow of fluid through the conduit 132, and this occurs when conduit 101 is acting in the high pressure side of the closed hydraulic circuit.

The piston or spool 127 is shifted from either of its positions described to the other by the differential of hydraulic pressures in the conduits 100 and 101. A control conduit 145 connects conduit 130 and consequently conduit 100 with a chamber 146 in valve 124 formed by the cylinder head 128, the bore 126 and the head of piston 127 adjacent land 139 and a conduit 147 connects conduit 132 and consequently conduit 101 with a chamber 148 in valve 124 similar to chamber 146 but at the opposite end of piston 127. It will be seen that if conduit 101 is placed, by reversing the output of pump 110, in the high pressure side of the closed circuit, conduit 147 will admit fluid under pressure into chamber 148 to force the piston 127 upwardly which, of course, will cause the land 141 to block the channel 137 to stop the flow of hydraulic fluid from the conduit 132 to the exhaust conduit 144 and that the fluid in chamber 146 will be displaced through conduit 145 into conduit 130 which will be connected by the shifting of the piston 127 through channel 133, bore 126, and channel 135 to the conduit 144. Thus either conduit 100 or 101 when placed in the high pressure side of the closed circuit will be stopped or closed off from the conduit 144 by the valve 124 and the conduit 100 or 101 which is acting as the low pressure side of the closed circuit will be opened by the valve 124 to conduit 144 which is connected to the tank 26 through the pressure relief valve 138.

As previously described, when the conduit 101 is in the low pressure side of the closed circuit a volume of hydraulic fluid substantially equal to the volume of hydraulic fluid placed therein by pump 117 must be displaced therefrom and since conduit 101 is connected to valve 124, conduit 144 and pressure relief valve 138 to tank 26, hydraulic fluid may be displaced from the conduit 101 by opening the pressure relief valve 138.

The hydraulic fluid supplied to the closed hydraulic circuit of motor 72 and pump 110 by pump 117 will be at a lower temperature than the hydraulic fluid exhausted from the motor 72 and thus it will act as a cooling medium or fluid for the high pressure closed circuit. It will also act as make-up fluid, that is, it will replace in the high pressure closed circuit any hydraulic fluid lost therefrom through the glands, joints and the like of pump 110 and motor 72.

It is important to note that the hydraulic fluid pumped by pump 117 into the high pressure closed hydraulic circuit enters the circuit between that port of the motor 72 that is acting as the exhaust port and that port of the pump 110 that is acting as the intake, low pressure or suction port. This arrangement insures that all of the cooling and make-up hydraulic fluid pumped by pump 117 will flow together with some hot hydraulic fluid discharged by the motor 72 to the pump 110 when the latter is operating at a high output volume whereby the temperature of the hydraulic fluid entering the pump 110 will be substantially lower than the temperature of the hydraulic fluid passing from the exhaust port of the motor 72. Throughout all speeds at which the motor 72 is operating the cooling and make-up hydraulic fluid pumped by pump 117 will cause hot hydraulic fluid to be displaced from the low pressure side of the high pressure closed circuit through the pressure relief valve 138.

It will be seen, of course, that if motor 72 is being driven at such speed or is adjusted so that the intake volume of pump 110 is less than the output volume of pump 117, the entire supply of hydraulic fluid for pump 110 will be comprised of the hydraulic fluid pumped by pump 117 and the volume of hydraulic fluid pumped by pump 117 which is in excess of the intake volume required by pump 110 will be discharged through valve 124, conduit 144 and pressure relief valve 138 to the tank 26. Pressure relief valve 138 is adjusted to open at a relatively low pressure and it functions to insure that at all times the conduits comprising the low pressure side of the high pressure closed circuit are maintained filled with hydraulic fluid.

The hydraulic circuit of the trench roller includes a low pressure circuit of which tank 26, conduit 116, pump 117, conduit 118, the hydraulic control valve unit 56 and conduit 119 form a part. In addition to the function of the low pressure circuit of supplying cooling and make-up fluid to the closed high pressure circuit, the low pressure circuit functions as a control circuit to operate the motor or frame struts 47, the steering motor 62, a double acting brake cylinder motor 149 associated with the brake band 97 and the piston motors 114 and 115 of the high pressure variable delivery pump 110. All of the motor units in the low pressure circuit are controlled by individual valves of the control valve unit 56. The control valve unit 56 is fully described and claimed in my co-pending application, Serial No. 627,848, filed November 10, 1945, now Patent No. 2,486,087, dated October 25, 1949, for a Hydraulic Valve and therefore is described only briefly here. As previously set forth, hydraulic fluid pumped by the pump 117 normally flows through control valve unit 56 and is discharged therefrom into conduit 119. The control valve unit 56 is comprised of a plurality of identical individual banked valves of the spool or shiftable core type and one of the valves of the control valve unit 56 is indicated at 150. Valve 150 controls both of the piston motors 114 and 115 of pump 110. The construction of valve 150 is such that when its control lever 151 is moved to one position, hydraulic oil flowing therethrough from conduit 118 is diverted into a conduit 152 that leads to the cylinder head of motor 115 and this hydraulic fluid operates the piston motor 115 to move or shift the ring or housing 113 to the right, as seen in Fig. 7. Movement of the ring or housing 113 to the right causes the piston of piston motor 114 to displace hydraulic fluid from the cylinder thereof through a conduit 153, which fluid enters the body of the valve 150 and is caused to flow through the other valves of the unit and into the conduit 119. When the control lever 151 of valve 150 is moved in the opposite direction, the flow of hydraulic fluid is reversed from that described in the conduits 152 and 153 to shift the ring or housing 113 to the left and when the control lever 151 of valve 150 is in a central or neutral position, the conduits 152 and 153 are blocked whereby the piston motors 114 and 115 will be locked to maintain the ring or housing 113 in adjusted position. It is the shifting and positioning of the ring or housing 113 with respect to the rotor 111 which affects the output volume of hydraulic fluid being pumped by pump 110 which, of course, controls the speed of operation of motor 72 as well as its direction of operation for driving the roll 10 of the trench roller. The control valve unit 56 includes three other valves, 154, 155 and 156, all identical in construction with valve 150. Valve 154 controls the operation of the expandable and contractable frame struts or double acting hydraulic piston motors 47, which struts or piston motors are connected in parallel and to the valve 154 by conduits 157 and 158. Valve 155 controls the operation of the steering motor 62 through conduits 159 and 160. The valve 156 controls the double acting piston motor 149 associated with the brake band 97 for positively contracting it about the drum 96 and for positively expanding it therefrom. The valve unit 56 includes a drain conduit for collecting hydraulic fluid that might support its cores or spools and this drain conduit is connected by a conduit 162 that returns the hydraulic fluid to the tank 26.

From the description of the valve unit 56 herein given it will be seen that when hydraulic fluid is diverted, for example, from conduit 118 by the valve 150 into conduit 152, a volume of hydraulic fluid substantially equal to the volume of fluid diverted into conduit 152 will be supplied through conduit 153 from the piston motor 114 to the conduit 119 and thus the flow of hydraulic fluid through conduit 119 will be uninterrupted. Because all of the valves 150, 154, 155 and 156 are alike, when any one of them is actuated to divert hydraulic fluid to one of the control motors of the trench roller, then a volume of fluid substantially equal to that diverted by the valve to the motor which it controls will also be displaced from the motor through the valve and into the conduit 119. The structure of the valves is such that any two or all of them may be operated to control simultaneously their respective motors.

All of the motors controlled by the individual valves of valve unit 56 are expandable and contractable piston and cylinder type motors and by referring to the motors or expandable and contractable frame struts 47 for an example it will be seen that should the control lever of valve 154 be moved to cause the hydraulic fluid pumped by the pump 117 to be diverted to the conduit 158, the pistons of the struts of motors 47, as seen in Fig. 7, will move upwardly to the upper limit of their strokes and when the pistons reach this upper limit they will have displaced substantially all of the hydraulic fluid thereabove from the cylinders 48 through the conduit 157 into the conduit 119. It will be seen that when the pistons of the motors 47 reach this upper limit of their strokes and can travel no further, the conduit 158 will be effectively blocked and therefore the pump 117 would stall, thus stalling the pump 110 because both pumps 117 and 110 are driven from the same shaft. Accordingly, I have provided a by-pass circuit including a pressure relief valve 161 that connects the conduits 118 and 119 to by-pass the control valve unit 56. The by-pass including pressure relief valve 161 will operate when any one of the piston motors controlled by any one of the individual valves of the control valve unit 56 is stalled or has reached the end of its stroke and therefore there will always be hydraulic fluid flowing in the conduit 119. It will also be seen that while the motors controlled by the valves of control valve unit 56, as herein shown, are all of the double acting piston and cylinder type, if desired, one or all of the motors may be of the rotary type.

In the operation of my improved three-wheeled or tricycle type trench roller, the roller will be attached to the tow-bar 14 of the towing vehicle 15 and with its wheels 12 and 13 swung to their parallel positions indicated in Fig. 1 and locked in that position by the steering motor 62 and with the roll 10 in the elevated position indicated in dot-dash lines in Fig. 1 and locked in that position by the brake band 97, the trench roller may be towed along a road or highway as a two-wheeled trailer to where it is to operate to roll material into a trench formed along the side of the road when the road is being widened, for example. In order to disconnect the trench roller from the towing vehicle the brake band 97 is released and the roll 10 is permitted to rotate upon the ball 108 connected to the hitch mechanism 109 of the tow-bar 14. After the roll 10 has swung eccentrically about the ball 108 and has engaged the ground, the hitch mechanism 109 holding the ball 108 will be released therefrom. With the engine 24 running, the operator will then operate the control lever of valve 155 to swing the wheels 12 and 13 to their tandem or steering position and he will then operate the control lever 151 of valve 150 in the direction required to operate the motor 72 to cause the roll 10 to propel or drive the trench roller to the ditch that is to be rolled. During this time, of course, he will operate the control lever of valve 155 to steer the trench roller as required by swinging the wheels 12 and 13 together in opposite directions. The wheels 12 and 13 are reversibly steerable, that is, swingable in opposite directions about their axes simultaneously in order that the trench roller may roll in a curved ditch, that is, so that the roll 10 may travel along either an inside or an outside arc the radius of which lies substantially upon the axis of the roll 10. It will, of course, be seen that if the trench to be rolled is not completely filled with the material to be rolled therein that the level of the material in the trecnh and upon which the roll 10 is riding will be lower than the surface of the road upon which the bicycle wheels 12 and 13 are riding. In order that the rolling surface of the wide rim of the roll 10 may be maintained horizontal, or if desired at an angle, while rolling the shoulder of the road, the operator by operating control valve 154 of the control valve unit 56 may cause the expandable and contractable main frame struts 47 to operate the frame means which connects the roll 10 with the bicycle unit to swing as a parallelogram whereby the support or frame member 17 for the roll motor 72 and the frame of the bicycle unit 16 will move vertically with respect to each other to shift the plane in which the axes of the wheels 12 and 13 lie with respect to the plane in which the axis of the roll 10 lies and as the operator operates the roll in reverse directions along the trench, rolling additional material thereinto thereby raising the level of the material therein, he may intermittently operate the frame strut members 47 to raise the plane in which the axis of the roll 10 lies, thereby maintaining the surface of the material which he is rolling into the ditch level. The frame strut motors 47 may also be operated to cause both the wheels 12 and 13 and the roll 10 to lean laterally together to either side of the vertical whereby sloping shoulders and the like may be rolled by the roll 10.

When the trench roller is to be moved or transported, for example, to another trench located a distance away, the trench roller will be connected to the tow-bar 14 of the towing vehicle 15 by placing the ball 103 in the hitch mechanism 109 and by operating the control valve 150 to cause the motor 72 to rotate the roll 10 about the axis of the ball 103 which is offset with respect to the axis of the roll 10 thereby swinging the roll eccentrically to the position shown in dot-dash lines in Fig. 1 and the operator will operate valve 156 to set the brake of the roll 10 by contracting the brake band 97 upon the drum 96. He will then operate the valve 155 to swing the wheels 12 and 13 to their parallel or two-wheeled trailer position and when the valve 155 is returned to its neutral position, the wheels 12 and 13 will be locked in the parallel or two-wheeled trailer position.

From the foregoing description of the trench roller and its operation it will be apparent that I have provided an improved three-wheeled roller including a bicycle unit having a pair of reversely steerable wheels at one side thereof that may be swung from tandem position to parallel position and includes as the third wheel of the roller a wide rimmed roll carried by an adjustable frame means that spaces it to one side of the bicycle wheels and by which the plane in which the axes of the bicycle unit wheels lie and the plane in which the axis of the wide rimmed roll lies may be shifted vertically with respect to each other and by which these planes, or axes, may be shifted from horizontal positions.

It will also be seen that I have provided a trench roller wherein the hydraulic apparatus and the improved system thereof is carried by the main frame of the trench roller or more specifically by the main frame of the bicycle unit thereof, and wherein the motor that drives the roller is contained entirely within the confines of the wide rim of the roll and drives the roll directly through a multiple-lobed cam.

It will also be seen that the hydraulic circuit of the trench roller is an improved circuit wherein at all times part or all of the hydraulic fluid discharged from a secondary or low pressure circuit, which preferably is a control circuit, including a constant volume pump, is fed to the intake port of a high pressure and preferably a variable volume pump in a main, primary, or high pressure substantially closed circuit from which hydraulic fluid is constantly being displaced as it passes or is exhausted by a high pressure reversible motor therein because of the addition of the cooling and make-up fluid thereto discharged from the secondary circuit. This hydraulic circuit is described and claimed in my divisional application, Serial No. 154,790, filed April 8, 1950, now Patent No. 2,621,479, dated December 16, 1952, for a Hydraulic System Including a Cooling Circuit for the Pump Thereof.

Obviously those skilled in the art may make various changes in the details and arrangement of parts without departing from the spirit and scope of the invention as defined by the claims hereto appended and I wish therefore not to be restricted to the precise construction herein disclosed.

Having thus described and shown an embodiment of my invention, what I desire to secure by Letters Patent of the United States is:

1. A roller including a wide rimmed roll, a bicycle unit positioned laterally of said roll including a frame, tandem steerable wheels on said frame and a power unit, and frame means pivotally interconnecting said roll and said bicycle unit, said frame means including spaced parallel motion linkages pivotally connected at their ends and means for pivotally adjusting said linkages to adjust the relative heights of said roll and said bicycle unit.

2. A reversible three wheel roller including a roller frame, a large rimmed heavy roll rotatably mounted relative to said frame, a laterally spaced bicycle unit including a frame and a pair of tandem steerable wheels, a primary driving motor and a pump driven thereby carried by said bicycle unit frame, a hydraulic driving motor carried by said roll, and a third frame interconnecting said roller frame and said bicycle unit frame, said third frame including parallel motion mechanism pivoted to said roller frame and said bicycle unit frame, and adjusting means to adjust said parallel motion mechanism and consequently the relative heights of said roll and said bicycle unit.

3. A roller including a roller frame, a wide rimmed roll rotatably connected to roll relative to said frame, a bicycle unit positioned laterally of said roll including a frame and a pair of tandem steerable wheels and a power unit, a third frame means interconnecting said roller frame and said bicycle unit frame, said third frame means including spaced parallel motion linkages pivoted to said roller frame and said bicycle unit frame and means for pivotally adjusting said linkages to adjust the relative heights of said roll and said bicycle unit, and means for adjusting said wheels reversely and operable to adjust them from substantially tandem to substantially parallel positions.

4. A roller including a roller frame, a wide rimmed roll rotatably connected to roll relative to said frame, a bicycle unit positioned laterally of said roll including a frame and a pair of tandem steerable wheels and a power unit, a third frame means interconnecting said roller frame and said bicycle unit frame, said third frame means including spaced parallel motion linkages pivoted to said roller frame and said bicycle unit frame and means for pivotally adjusting said linkages to adjust the relative heights of said roll and said bicycle unit, means for adjusting said wheels reversely and operable to adjust them from substantially tandem to substantially parallel positions, and eccentrically mounted means associated with said roll for attaching said roll to a truck and lifting it off the ground by rotating said roll.

5. A roller including a roller frame, a wide rimmed roll rotatably connected to roll relative to said frame, a bicycle unit positioned laterally of said roll including a frame and a pair of tandem steerable wheels and a power unit, a third frame means interconnecting said roller frame and said bicycle unit frame, said third frame means including spaced parallel motion linkages pivoted to said roller frame and said bicycle unit frame and means for pivotally adjusting said linkages to adjust the relative heights of said roll and said bicycle unit, means for adjusting said wheels reversely and operable to adjust them from substantially tandem to substantially parallel positions, and means for attaching said roll to a truck and lifting it off the ground by rotating said roll, said lifting means including an attaching member carried by said roll and mounted eccentrically of the axis of rotation thereof.

6. A roller including a frame, a heavy roll carried thereby, steering wheels connected to said frame, means for holding said steering wheels in locked parallel relation, a motor for driving said roll, and means for attaching said roll to a truck and for lifting it off the ground by rotating said roll including a ball carried by said roll and mounted eccentrically of the axis of rotation thereof.

FRED J. WRIGHT.

References Cited in the file of this patent

UNITED STATES PATENTS

| Number | Name | Date |
| --- | --- | --- |
| 1,325,277 | Damaizin | Dec. 16, 1919 |
| 1,621,856 | Sedgwick | Mar. 22, 1927 |
| 1,642,103 | Daubenmeyer | Sept. 13, 1927 |
| 2,120,745 | Greiner et al. | June 14, 1938 |
| 2,197,395 | Keeler | Apr. 16, 1940 |
| 2,228,411 | Sheridan | Jan. 14, 1941 |
| 2,240,236 | Aitken | Apr. 29, 1941 |
| 2,255,782 | Kendrick | Sept. 16, 1941 |
| 2,275,321 | Scates | Mar. 3, 1942 |
| 2,348,445 | Bayer | May 9, 1944 |
| 2,418,123 | Joy | Apr. 1, 1947 |
| 2,453,510 | Jackson | Nov. 9, 1948 |
| 2,549,182 | Ekenstam | Apr. 17, 1951 |